(12) United States Patent
Baek

(10) Patent No.: US 8,592,066 B2
(45) Date of Patent: Nov. 26, 2013

(54) BATTERY ASSEMBLY

(75) Inventor: Woon-Seong Baek, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 292 days.

(21) Appl. No.: 12/869,475

(22) Filed: Aug. 26, 2010

(65) Prior Publication Data

US 2011/0183160 A1 Jul. 28, 2011

Related U.S. Application Data

(60) Provisional application No. 61/298,267, filed on Jan. 26, 2010.

(51) Int. Cl.
*H01M 2/10* (2006.01)

(52) U.S. Cl.
USPC .......................................................... 429/99

(58) Field of Classification Search
USPC .......................................................... 429/99
See application file for complete search history.

(56) References Cited

U.S. PATENT DOCUMENTS

| | | | |
|---|---|---|---|
| 2004/0251872 A1 * | 12/2004 | Wang et al. | 320/112 |
| 2005/0214597 A1 | 9/2005 | Kim et al. | |
| 2006/0073384 A1 | 4/2006 | Heo et al. | |
| 2008/0292955 A1 * | 11/2008 | Byun et al. | 429/163 |
| 2009/0092860 A1 | 4/2009 | Yamamoto et al. | |
| 2009/0110964 A1 | 4/2009 | Dobata et al. | |
| 2011/0091747 A1 | 4/2011 | Park et al. | |

FOREIGN PATENT DOCUMENTS

| | | |
|---|---|---|
| EP | 1995804 | 11/2008 |
| JP | 2003187877 | 7/2003 |
| JP | 2003308881 | 10/2003 |
| JP | 2006093152 | 4/2006 |
| JP | 2007523458 | 8/2007 |
| JP | 2008293940 | 12/2008 |
| JP | 200999542 | 5/2009 |
| JP | 2009110708 | 5/2009 |
| JP | 2009193783 | 8/2009 |
| JP | 201191046 | 5/2011 |
| KR | 1020010004071 A | 1/2001 |
| KR | 1020020077293 A | 10/2002 |
| KR | 10-2005-0043022 | 5/2005 |
| KR | 10-2005-0055580 | 6/2005 |
| KR | 10-2005-0123367 | 12/2005 |
| KR | 10-2006-0134401 | 12/2006 |

(Continued)

OTHER PUBLICATIONS

Extended European Search Report issued Apr. 17, 2012 in connection with European Patent Application Serial No. 10250898.3, which claims priority from the present application.

(Continued)

*Primary Examiner* — Ula C Ruddock
*Assistant Examiner* — Thomas H. Parsons
(74) *Attorney, Agent, or Firm* — Robert E. Bushnell, Esq.

(57) ABSTRACT

A battery assembly that standardizes a protective circuit module to be commonly used for various types of bare cells. The battery assembly includes a bare cell, and an adaptor structure positioned on a first end portion of the bare cell and having a seat in which the protective circuit module is seated. The adaptor structure electrically connects the protective circuit module to the bare cell. The protective circuit module has a standardized shape operationally connectable to various types of bare cells.

21 Claims, 7 Drawing Sheets

(56) References Cited

FOREIGN PATENT DOCUMENTS

| KR | 10-2007-0042031 A | | 4/2007 |
|----|-------------------|---|--------|
| KR | 1020050097781 | * | 4/2007 |
| KR | 1020090002207 | | 1/2009 |

OTHER PUBLICATIONS

Korean Office Action issued Jul. 30, 2012 in connection with Korean Patent Application Serial No. 10-2010-0085951, which claims the above-captioned application as a priority document, and Request for Entry of the Accompanying Office Action attached herewith.

Chinese Office Action dated Apr. 22, 2013 in corresponding Chinese Patent Application No. 201010529461.X, which claims priority from present application.

Japanese Office Action dated Dec. 11, 2012 in connection with Japanese Patent Application No. 2010-244028 and Request for Entry of the Accompanying Office Action attached herewith.

Korean Office Action issued on Jul. 29, 2013 in the corresponding Korean Patent Application No. 10-2010-0085951.

* cited by examiner

BATTERY ASSEMBLY

CLAIM OF PRIORITY

This application makes reference to, incorporates the same herein, and claims all benefits accruing under 35 U.S.C. §119 from a provisional application earlier filed in the U.S. Patent & Trademark Office on 26 Jan. 2010 and there duly assigned Ser. No. 61/298,267.

BACKGROUND OF THE INVENTION

1. Field of the Invention

The embodiment of the present invention relates to a battery assembly, and more particularly, to a battery assembly capable of improving productivity and contention by applying a standardized protective circuit module (PCM) to various types of bare cells.

2. Discussion of Related Art

In recent, with the technology development and increased demand of a mobile device, the demand of a secondary battery as an energy source has been suddenly increased.

SUMMARY OF THE INVENTION

Therefore, the embodiment of the present invention is to provide an improved battery assembly.

The embodiment of the present invention further provides a battery assembly that standardizes a protective circuit module to be commonly used for various types of bare cells.

According to an embodiment of the present invention, there is provided a battery assembly which includes a bare cell, a bare cell having a cap plate which is located on a side of the bare cell for closing the bare cell, an adaptor structure located on the cap plate, and a protective circuit module (PCM) including a protective circuit. The adaptor structure has a surface area substantially the same as a surface area of the cap plate. The adaptor structure includes a seat adapted to accommodate the PCM.

The bare cell may include a can, an electrode assembly received in the can, a cap assembly sealing a first end portion of the can, and an electrode terminal protruding from the cap assembly.

The adaptor structure may include a first lead and a second lead formed in an interior of the adaptor structure for electrically connecting the protective circuit module to the bare cell. The first lead electrically connects the cap assembly of the bare cell to an external input and output terminal unit, and the second lead electrically connects the electrode terminal of the bare cell to the external input and output terminal unit.

The cap plate is electrically connected to a first electrode of the electrode assembly. The electrode terminal of the bare cell may be electrically connected to a second electrode of the electrode assembly. An insulating sheet may be formed between the second lead and the cap plate.

The adaptor structure may include a first recess formed on a surface of the adaptor structure facing the bare cell and being positioned corresponding to the first lead, so as to provide a space in which the bare cell and the first lead are connected, and a second recess formed on said surface of the adaptor structure facing the bare cell and being positioned corresponding to the second lead, so as to provide a space in which the bare cell and the second lead are connected.

The protective circuit module may include a first connecting terminal and a second connecting terminal formed on a side of the protective circuit module that is facing the adaptor structure. The first and second connecting terminals may be respectively connected to the first and second leads formed within the interior of the adaptor structure.

The adaptor structure may include a first connecting hole formed on a surface of the adaptor structure facing the protective circuit module and being positioned corresponding to the first lead and the first connecting terminal, so as to provide a space in which the first lead and the first connecting terminal are electrically connected, and a second connecting hole formed on said surface of the adaptor structure facing the protective circuit module and being positioned corresponding to the second lead and the second connecting terminal, so as to provide a space in which the second lead and the second connecting terminal are electrically connected.

The protective circuit module has a standardized shape operationally connectable to a plurality of bare cells. The plurality of bare cells may include a cylindrical type bare cell, a prismatic type bare cell, a circular type bare cell, and a pouch type bare cell.

The battery assembly may include a safety element formed within an interior of the adaptor structure. The safety element may include at least one of a fuse, a bimetal, and a positive temperature coefficient (PTC) element. The safety element may be electrically connected to a second lead that is connected between an electrode terminal of the bare cell and the PCM.

The adaptor structure may be formed from a molding material. The adaptor structure may be formed as a case.

The protective circuit module may be mechanically and electrically coupled to the adaptor structure. In this case, a coupling protrusion may be formed on a portion of the protective circuit module that is facing the adaptor structure, and a coupling recess may be formed on a portion of the adaptor structure that is facing the protective circuit module. The coupling protrusion of the protective circuit module may be coupled to the coupling recess of the adaptor structure, so that the protective circuit module and the adaptor structure are coupled to each other.

An external input and output terminal unit may be formed on the protective circuit module and exposed to an exterior of the protective circuit module.

Alternatively, the external input and output terminal unit may be formed on the adaptor structure and exposed to an exterior of the adaptor structure. In this case, the adaptor structure may include an auxiliary substrate positioned within an interior of the adaptor structure. One side of the auxiliary substrate may be formed with the external input and output terminal unit being exposed to an exterior of the adaptor structure, and another side of the auxiliary substrate may be connected to the PCM via a connecting member formed within the interior of the adaptor structure.

The battery assembly may include a case covering the PCM and the adaptor structure. In this case, an external input and output terminal unit may be formed on one of the adaptor structure and the protective circuit module, and may be exposed to an exterior of the one of the adaptor structure and the protection circuit module. A pad unit may be formed in a region of the case that contacts the external input and output terminal unit, and the pad unit is electrically connected to the external input and output terminal unit.

BRIEF DESCRIPTION OF THE DRAWINGS

A more complete appreciation of the invention, and many of the attendant advantages thereof, will be readily apparent as the same becomes better understood by reference to the following detailed description when considered in conjuncsymbols indicate the same or similar components, wherein.

DETAILED DESCRIPTION OF THE INVENTION

Figure 1:
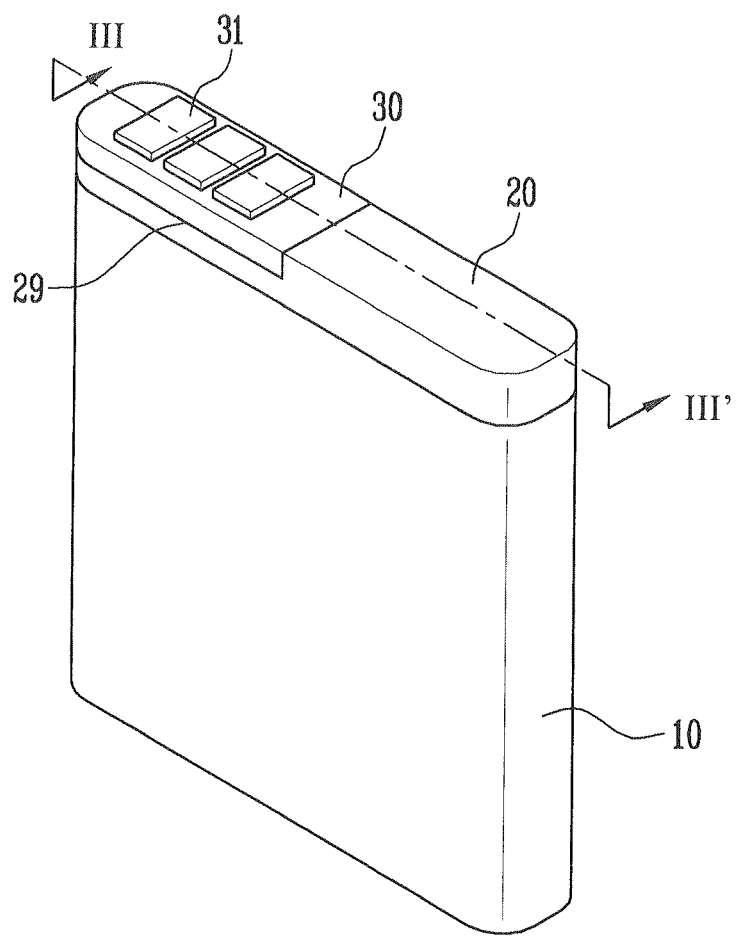
FIG. 1 is an oblique view illustrating a battery assembly constructed as a first embodiment according to the principles of the present invention.

In recent, with the technology development and increased demand of a mobile device, the demand of a secondary battery as an energy source has been suddenly increased.

The secondary battery is generally classified into a hard pack and an inner pack according to how the secondary battery is mounted in a case. Among those, the inner pack is used by covering a cover forming a portion of an external device in the state where the secondary battery is mounted inside the external device, thereby making the mounting relatively troublesome. There are advantages of the inner pack, however, in that the design is simple, the cost is inexpensive, and the compatibility is good.

In general, the inner pack is configured to include a chargeable and dischargeable bare cell and a protective circuit module that is electrically connected to the bare cell to control the charging and discharging of the bare cell and breaks a circuit upon an overcharging or an overdischarging. The inner pack is configured to include a resin that is filled in a gap between a combination of the bare cell and the protective circuit module, and an external frame that is molded in a shape mountable in the external device by packing the bare cell, the protective circuit module, and the resin.

Among those, the protective circuit module is configured to include a protective circuit substrate that is provided outside the bare cell, a protective circuit electrically connected to an electrode terminal of the bare cell formed on the protective circuit substrate, and external and internal input and output terminals that are provided at an opposite side of the protective circuit substrate and are connected to the external device.

The protective circuit module should be manufactured in various shapes according to a type of battery pack, such as a cylindrical shape (such shapes are usually standardized between the industry and the using manufacturers), a prismatic shape, a circular shape, and a pouch shape. Although the protective circuit module uses the same type of bare cell, it should be configured and designed to meet each specification due to various conditions of customer reliability and various outer designs. Many types of protective circuit modules should be managed in an actual mass production due to various variables. As a result, there are problems in that much time is consumed and the productivity is degraded.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, a battery assembly according to embodiments of the present invention will be described in detail with reference to the accompanying drawings.

FIG. 1 is a perspective view illustrating a battery assembly constructed as a first embodiment according to the principles of the present invention.

Referring to FIG. 1, a battery assembly constructed as the first embodiment according to the principles of the present invention is configured to include a bare cell 10, a protective circuit module 30, and an adaptor structure 20 that is positioned on an upper portion of bare cell 10 and has a seat 29 (i.e., a seat) in which protective circuit module 30 is seated.

Although not shown in FIG. 1, bare cell 10 is configured to include an electrode assembly, a can that receives an electrode assembly, and a cap assembly that seals an upper opening portion of the can and has an electrode terminal protruded therefrom. The electrode terminal and the cap assembly have different polarity. The electrode terminal and the cap assembly are insulated from each other.

Protective circuit module 30 has a standardized shape that is common for various types or sizes of batteries. An external input and output terminal unit 31 is formed on one surface of protective circuit module 30 that is exposed to an outside of protective circuit module 30. Although not shown, a protective circuit for protecting bare cell 10 is formed on another surface of protective circuit module 30 that is not facing the outside of protective circuit module 30. Seat 29 has a constant shape at all times for various types or sizes of batteries. That is, seat 29 has a shape that corresponds to the shape of protective circuit module 30 for receiving protective circuit module 30. Adaptor structure 20 plays a role for electrically connecting bare cell 10 to protective circuit module 30.

The electrical connection structure of protective circuit 30 and bare cell 10 constructed as the first embodiment according to the principles of the present invention will be described below with reference to FIGS. 2 and 3.

According to the present invention, when the type or size of the battery is changed, only the type or size of adaptor structure 20 that is positioned on the upper portion of bare cell 10 is changed, and seat 29 in which protective circuit module 30 is configured so that protective circuit module 30 may be seated has a constant shape at all times. Protective circuit module 30 is seated in adaptor structure 20. Therefore, the standardized protective circuit module 30 is coupled to adaptor structure 20, such that protective circuit module 30 may be configured in a single module that is both mechanically and electrically compatible with may different shapes, sizes and types of batteries and may be commonly used for various types of batteries. As a result, since there is no need to manufacture the complicated protective circuit module 30 in numerous distinctive and incompatible shapes which vary among various types of batteries, the productivity of the battery can be improved.

Figure 2:
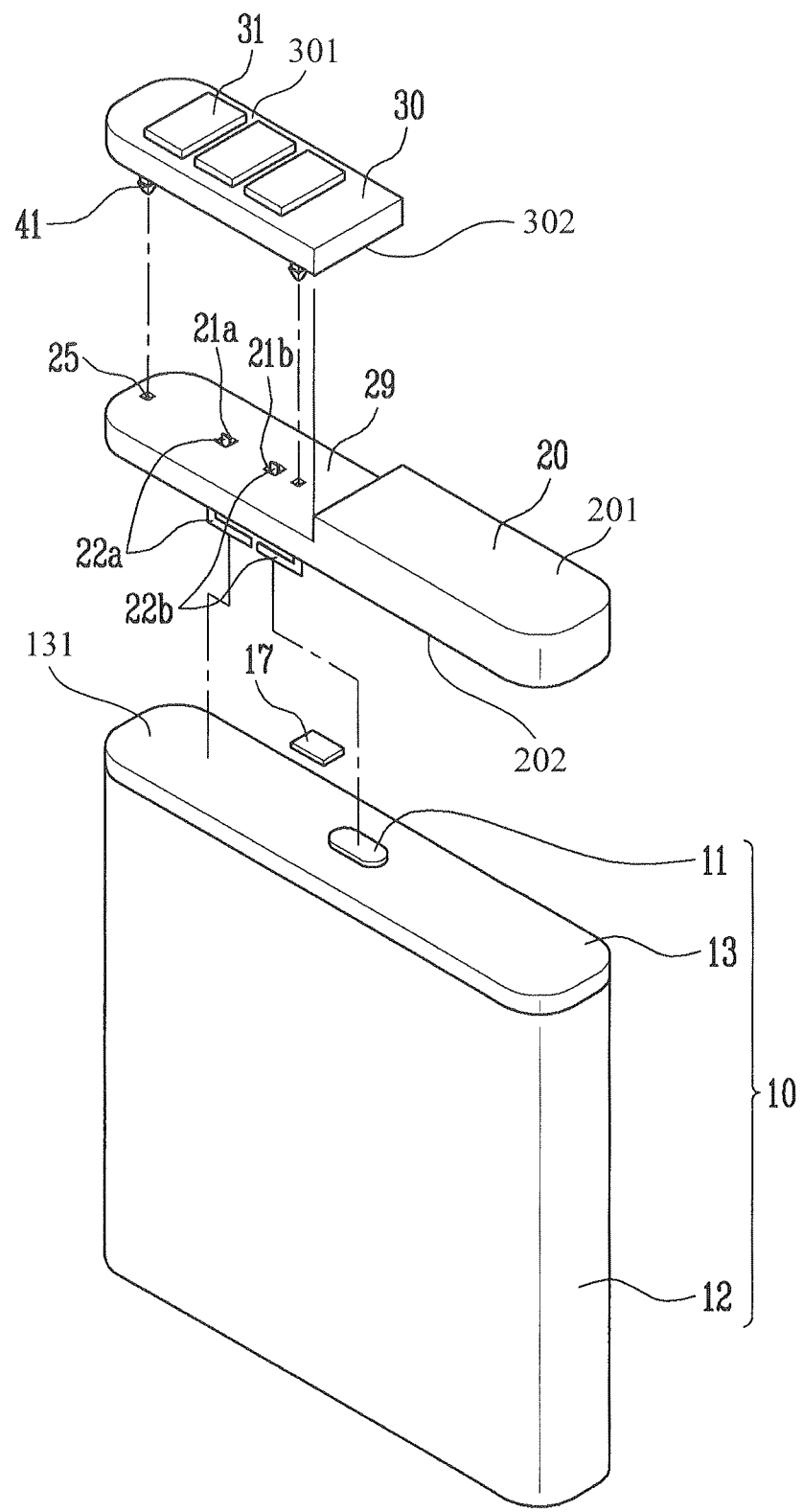
FIG. 2 is an exploded oblique view illustrating the battery assembly constructed as the first embodiment according to the principles of the present invention.

FIG. 2 is an exploded perspective view illustrating the battery assembly constructed as the first embodiment according to the principles of the present invention. FIG. 3 is a cross-sectional view of the battery assembly taken along line III-III' of FIG. 1

Referring to FIG. 2, bare cell 10 includes a can 12 that receives the electrode assembly (not shown) and a cap assembly 13 that seals can 12. Cap assembly 13 for sealing can 12 is electrically connected to an anode (not shown) of the electrode assembly. Electrode terminal 11 is coupled to cap assembly 13 in an insulated state through an insulating gasket (not show), and electrode terminal 11 is electrically connected to a cathode (not shown) of the electrode assembly. The configuration of bare cell 10 as shown in FIG. 2 is described by way of example. The embodiment of the present invention is, however, not limited thereto.

The inside of adaptor structure 20 in which protective circuit module 30 is seated is formed with a first lead 22a and a second lead 22b to electrically connect bare cell 10 to protective circuit module 30. One side of first lead 22a is electrically connected to cap assembly 13 of bare cell 10, and the other side of first lead 22 is electrically connected to external input and output terminal unit 31 of protective circuit module 30. One side of second lead 22b is electrically connected to electrode terminal 11 of bare cell 10, and the other side of second lead 22b is electrically connected to the external input and output terminal unit 31 of protective circuit module 30. Also, a first connecting hole 21a and a second connecting hole 21b are formed on adaptor structure 20. First connecting hole 21a is positioned corresponding to first lead 22, and second connecting hole 21b is positioned corresponding to second lead 22b, so as to provide a space for connecting external members to first lead 22a and second lead 22b, respectively. At this time, second lead 22b may be connected to electrode terminal 11 in the state of interposing insulating sheet 17 between second lead 22b and electrode terminal 11, in order to prevent a short circuit due to an electrical contact between second lead 22b and cap assembly 13.

In addition, as shown in FIG. 2, a lower side surface area 202 of adaptor structure 20 is substantially the same as an upper side surface area 131 of cap plate 13. An outer surface 301 of protective circuit module 30 lies flush with an outer surface 201 of adaptor structure 20. Moreover, a base 302 of protective circuit module 30 has a surface area that is substantially less than lower side surface area 202 of adaptor structure 20.

Figure 3:
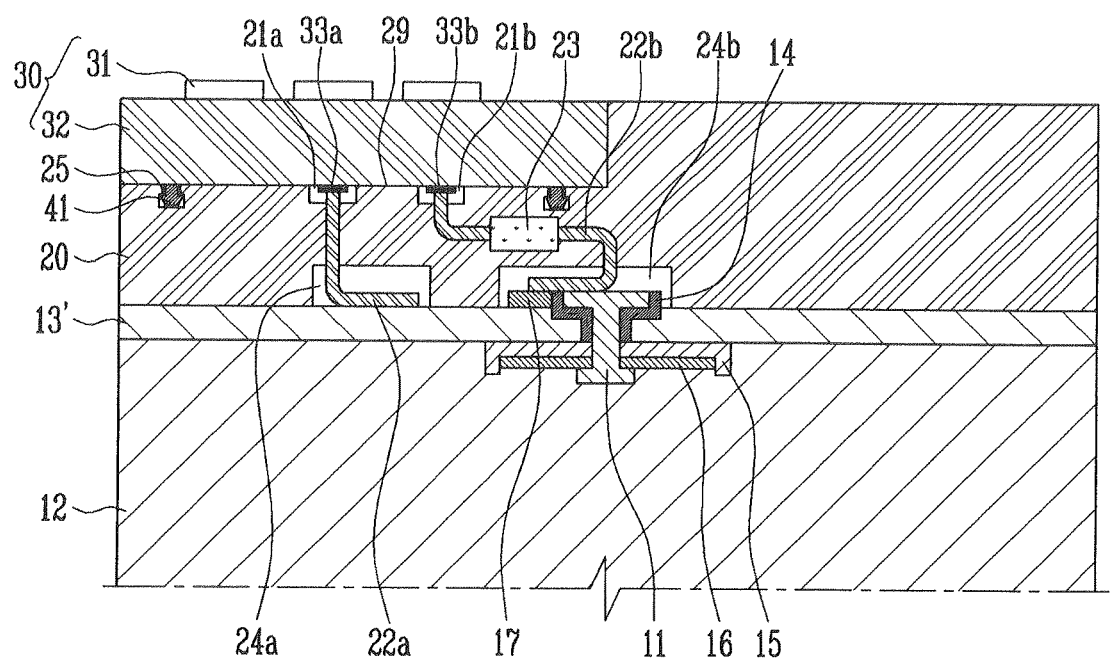
FIG. 3 is a cross-sectional view of the battery assembly constructed as the first embodiment according to the principles of the present invention taken along line III-III' of FIG. 1.

Referring to FIG. 3, adaptor structure 20 may be formed from a molding material, and that molds a safety element 23 to be inserted therein. That is, during a molding process, adaptor structure 20 is molded in one-body together with safety element 23 which is disposed inside adaptor structure 20. Alternatively, adaptor structure 20 may be a case that includes a space in which the safety element is disposed. Herein, safety element 23 is used to charge the battery at a stable level.

In addition, protective circuit module 30 and adaptor structure 20 are mechanically coupled to each other by a coupling member. For example, protective circuit module 30 and adaptor structure 20 can be coupled to each other by a coupling protrusion 41 formed on a lower portion of protective circuit module 30 and a coupling recess 25 formed on an upper portion of adaptor structure 20 contacting coupling protrusion 41. As a result, protective circuit module 30 and adaptor structure 20 can be coupled with and separated from each other.

Referring to FIG. 3, can 12 is made of aluminum or aluminum alloy having an approximate rectangular parallelepiped shape. Can 12 receives the electrode assembly (not shown) through an opened upper end opening, thereby playing a role of a container of the electrode assembly and an electrolyte. In addition, can 12 itself can play a role of a terminal.

Briefly describing the inside of can 12, cap assembly 13 (see FIG. 1) is provided on the opened upper end of can 12, thereby sealing the inside of can 12. More specifically, cap plate 13' is disposed on the opened upper end of can 12 for sealing the opened upper end of can 12. Insulating gasket 14 in a tube shape is installed between cap plate 13' and electrode terminal 11 penetrating through a terminal hole formed at a central portion of cap plate 13' to electrically insulate cap plate 13' from electrode terminal 11. In addition, an insulating plate 15 is disposed on a lower surface of cap plate 13' and a terminal plate 16 is disposed on a lower surface of insulating plate 15. A bottom portion, i.e., a lower end, of electrode terminal 11 is electrically connected to terminal plate 16.

At this time, an anode tap (not shown) drawn from an anode plate (not shown) of the electrode assembly (not shown) is welded to the lower surface of cap plate 13', and a cathode tap (not shown) drawn from a cathode plate (not shown) of the electrode assembly (not shown) is welded to the lower end of electrode terminal 11. As described above, cap plate 13' is electrically connected to the anode, and electrode terminal 11 is electrically connected to the cathode.

Adaptor structure 20 disposed on the upper portion of bare cell 10 is formed with seat 29 in which protective circuit module 30 is seated, and is mechanically coupled to coupling protrusion 41 of protective circuit module 30 by coupling recess 25 of adaptor structure 20. Adaptor structure 20 is electrically connected to bare cell 10 by first lead 22a and second lead 22b that are formed inside adaptor structure 20.

One side of first lead 22a and second lead 22b is exposed to bare cell 10 and the other side thereof is exposed to protective circuit module 30. Thereby, cap plate 13' and first lead 22a, and electrode terminal 11 and second lead 22b of bare cell 10 are electrically connected to each other by bonding schemes such as soldering, spot, laser. At this time, a lower surface of adaptor structure 20 may be formed with a first recess 24a and a second recess 24b in order to provide a space in which bare cell 10 and leads 22a and 22b are connected. That is, first recess 24a is formed at the lower surface of adaptor structure 20 in order to provide a space in which bare cell 10 and first lead 22a are connected, and second recess 24b is formed at the lower surface of adaptor structure 20 in order to provide a space in which bare cell 10 and second lead 22b are connected. In addition, one portion of second lead 22b may be connected to safety element 23 in the manner as described above.

Protective circuit module 30 is configured to include a protective circuit substrate 32. One side of protective circuit substrate 32 is formed to be exposed to an outside of protective circuit module 30 and is formed with external input and output terminal unit 31. The other side of protective circuit substrate 32 is formed to face adaptor structure 20 and is formed with the protective circuit (not shown). The protective circuit and external input and output terminal unit 31 are electrically connected to each other by a conductive structure (not shown) that penetrates through protective circuit substrate 32. Furthermore, a first connecting terminal 33a and a second connecting terminal 33b are positioned on a side of protective circuit module 30 that faces adaptor structure 20.

First connecting terminal 33a and second connecting terminal 33b are electrically connected to first lead 22a and second lead 22b, respectively. At this time, a first connecting hole 21a having a positive polarity and a second connecting hole 21b having a negative polarity are formed on the top surface of adaptor structure 20 exposing first lead 22a and second lead 22b, so as to provide a space to connect protective circuit module 30 to first lead 22a and second lead 22b. Therefore, protective circuit module 30 and adaptor structure 20 are engaged firmly with each other.

First lead 22a and second lead 22b are generally made of a nickel material and easily connect bare cell 10 to protective circuit module 30. In other words, one side of first lead 22a is connected to the anode of protective circuit module 30 and the other thereof is connected to cap plate 13'. In addition, one side of second lead 22b is connected to the cathode of protective circuit module 30 and the other thereof is connected to electrode terminal 11. At this time, first lead 22a and second lead 22b are generally configured in an L-letter shaped structure or a flat structure. Meanwhile, insulating sheet 17 for insulating between second lead 22b that is connected to the cathode, and cap plate 13' that is the anode, is installed.

Safety element 23 that is connected to one region of second lead 22b is installed to safely protect the battery from overcurrent, overcharging, and overdischarging. A fuse, a bimetal, a positive temperature coefficient (PTC) element, etc. may be installed in safety element 23. Safety element 23 constructed as the first embodiment of the present invention is configured of the positive temperature coefficient that breaks the flow of current when a temperature exceeds a predetermined range, and rapidly resumes the flow of current when the temperature enters the corresponding predetermined temperature range.

Figure 4:
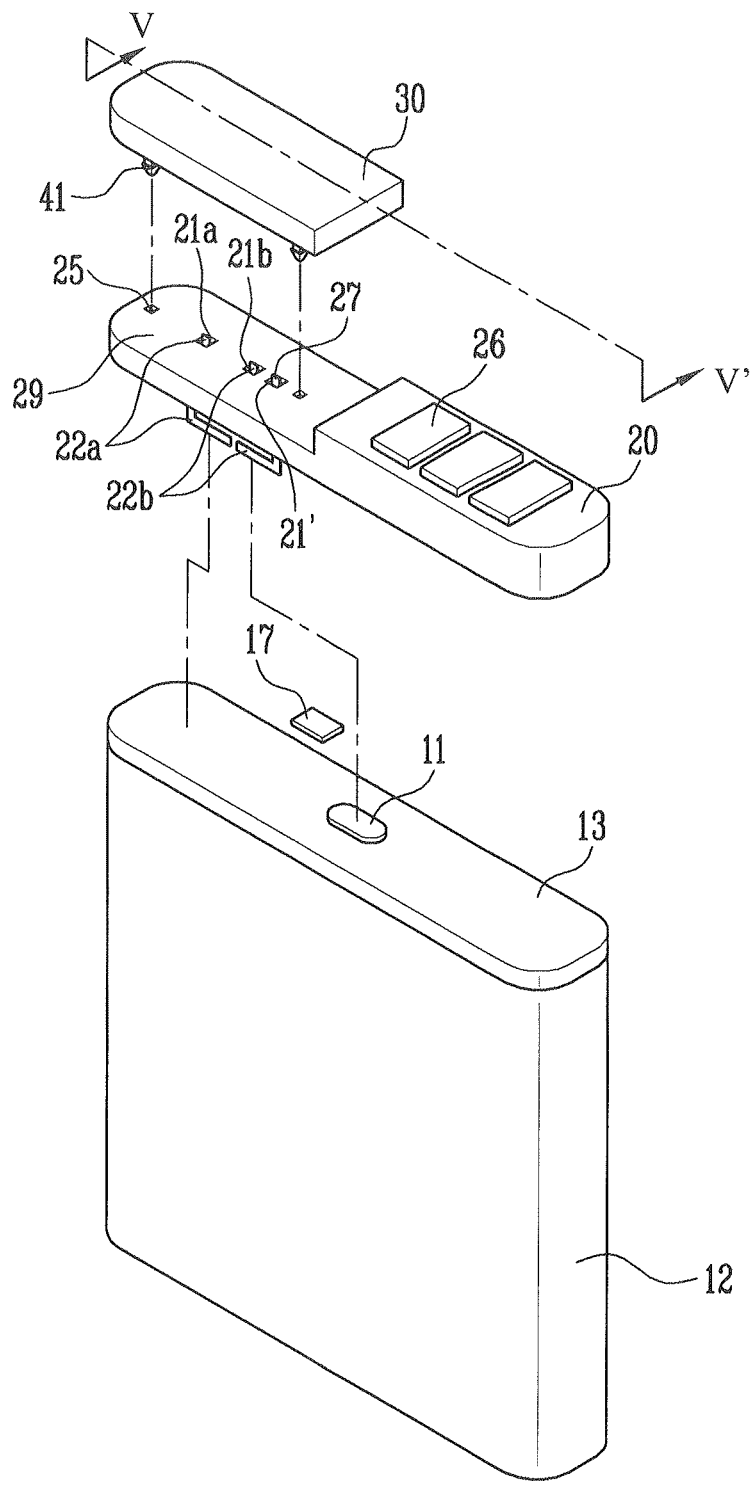
FIG. 4 is an exploded oblique view illustrating a battery assembly constructed as a second embodiment according to the principles of the present invention.
Figure 5:
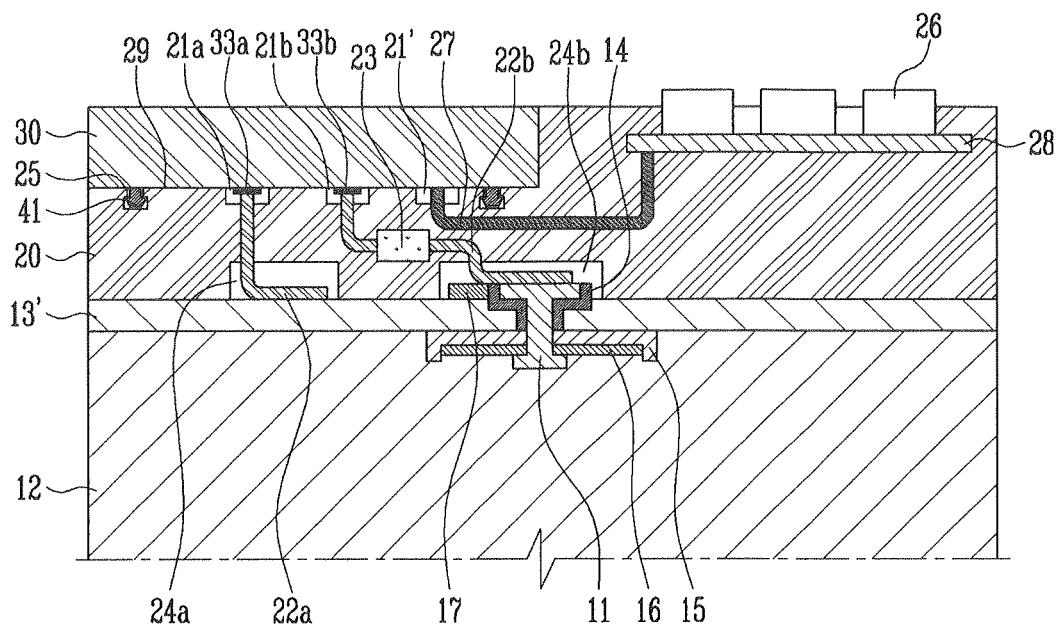
FIG. 5 is a cross-sectional view of the battery assembly constructed as the second embodiment according to the principles of the present invention taken along line V-V' of FIG. 4.

FIG. 4 is an exploded perspective view showing a battery assembly constructed as a second embodiment according to the principles of the present invention, and FIG. 5 is a cross-sectional view of the battery assembly taken along line V-V' of FIG. 4. In FIGS. 4 and 5, the description of the same components in the first embodiment of the present invention which is described in FIGS. 1 to 3, will be omitted.

Referring to FIG. 4, the battery assembly constructed as the second embodiment according to the principles of the present invention includes bare cell 10, protective circuit module 30, and adaptor structure 20. Protective circuit module 30 is formed with a protective circuit (not shown) for bare cell 10 and has a standardized shape that is common for various types and sizes of batteries. Adaptor structure 20 is formed with seat 29 in which protective circuit module 30 is seated, and is positioned on an upper portion of bare cell 10 to electrically connect protective circuit module 30 to bare cell 10. At this time, external input and output terminal unit 26, which is connected to an external device, is formed to be exposed to the outside of adaptor structure 20. A third connecting hole 21' is formed on an upper surface of adaptor structure 20 on which protective circuit module 30 is seated. A connecting member 27 is formed inside adaptor structure 20, by molding adaptor structure 20 together with connecting member 27. One side of connecting member 27 is exposed via third connecting hole 21' and is electrically connected with protective circuit module 30. Another side of connecting member 27 is electrically connected with an auxiliary substrate 28, which is shown in FIG. 5.

Referring to FIG. 5, adaptor structure 20 is formed with seat 29 in which protective circuit substrate 32 mounted with the protective circuit (not shown) is seated. Auxiliary substrate 28 is positioned in an interior of adaptor structure 20. Auxiliary substrate 28 may be a printed circuit board (PCB) for connecting protective circuit module 30 with external input and output terminal unit 26. One side of auxiliary substrate 28 is formed with external input and output terminal unit 26 to be exposed to an outside of adaptor structure 20, and the other side of auxiliary substrate 28 is connected to connecting member 27. The protective circuit and external input and output terminal unit 26 may be electrically connected to each other by connecting member 27 formed in the inside of adaptor structure 20.

First lead 22a and second lead 22b are electrically connected to cap plate 13' and electrode terminal 11, respectively. One portion of second lead 22b is formed with safety element 23. At this time, adaptor structure 20 may be formed from a molding material that molds safety element 23 and first lead 22a and second lead 22b to be inserted therein, or a case that includes a space therein.

Figure 6:
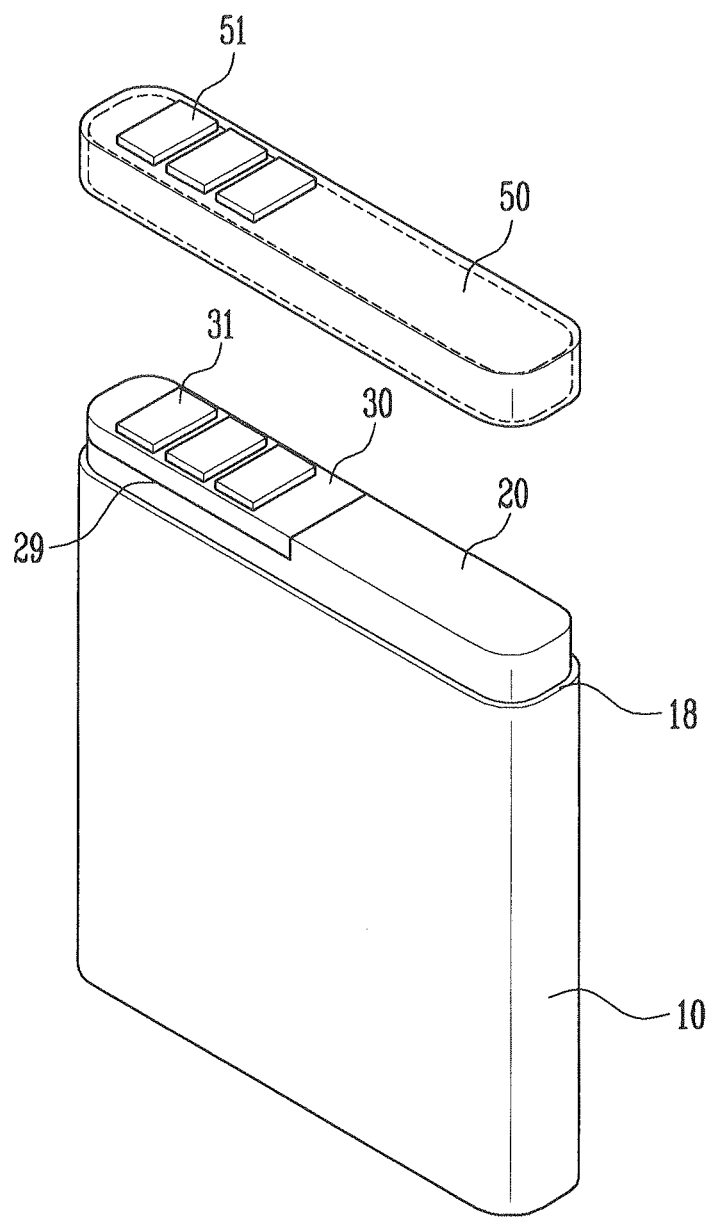
FIG. 6 is a perspective view illustrating a battery assembly constructed as a third embodiment according to the principles of the present invention.

FIG. 6 is a perspective view showing a battery assembly constructed as a third embodiment according to the principles of the present invention.

Referring to FIG. 6, adaptor structure 20 in which protective circuit module 30 is seated is formed to be smaller than a circumference of an upper end portion of bare cell 10, and the circumference of the upper end portion of bare cell 10 is formed with a connection part 18. Connection part 18 may be connected to an upper case 50 that covers protective circuit module 30 and adaptor structure 20. In upper case 50, a region contacting external input and output terminal unit 31 of protective circuit module 30 is formed with a pad unit 51. Protective circuit module 30 and upper case 50 may be electrically connected by welding pad unit 51 and external input and output terminal unit 31 together.

Herein, external input and output terminal 31 may be formed on adaptor structure 20. In this case, pad unit 51 should be formed on a side of upper case 50 that is facing adaptor structure 20. In addition, although the embodiment of the present invention describes that the battery has the electrode terminal that is the cathode and the cap assembly that is the anode, the polarity thereof can be changed.

Figure 7:
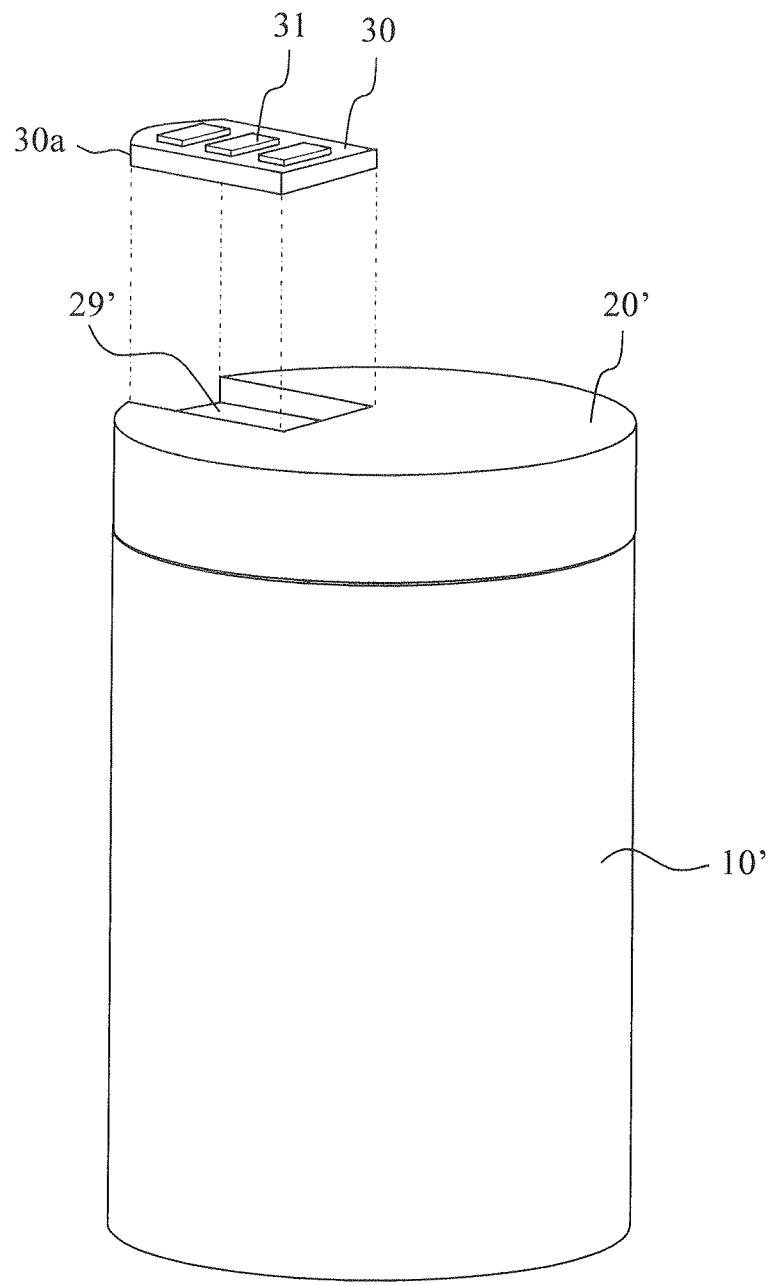
FIG. 7 is an exploded oblique view illustrating a battery assembly constructed as a fourth embodiment according to the principles of the present invention.

FIG. 7 is an exploded oblique view illustrating a battery assembly constructed as a fourth embodiment according to the principles of the present invention.

Referring to FIG. 7, the battery assembly constructed as the fourth embodiment of the present invention is configured to include a bare cell 10', a protective circuit module 30', and a adaptor structure 20' that is positioned on an upper portion of bare cell 10' and has a seat 29' in which protective circuit module 30 is seated. Bare cell 10' is formed of a cylindrical shape. That is, the cross-section of bare cell 10' is circular. Adaptor structure 20' has a shape that corresponds to the shape of bare cell 10' such that adaptor structure 20' can be mounted on bare cell 10'. In addition, adaptor structure 20' is formed with a seat 29 for receiving protective circuit module 30 having a standardized shape that is common for various types or sizes of batteries. In the fourth embodiment of the present invention, an external input and output terminal unit 31 is formed on one surface of protective circuit module 30 that is exposed to an outside of protective circuit module 30. Alternatively, the external input and output terminal unit may be formed on a surface of adaptor structure 20' that is exposed to an outside of adaptor structure 20'.

Protective circuit module 30 has a standardized shape that is common for various types or sizes of batteries. An external input and output terminal unit 31 is formed on one surface of protective circuit module 30 that is exposed to an outside of protective circuit module 30. Seat 29 has a constant shape at all times for various types or sizes of batteries. That is, seat 29 has a shape that corresponds to the shape of protective circuit module 30 for receiving protective circuit module 30. Adaptor structure 20 plays a role for electrically connecting bare cell 10 to protective circuit module 30. The outboard edge 30a of protective circuit module 30 has similar, or even the same shape around an outboard peripheral edge of adaptor structure 20'.

Referring to FIGS. 2 and 7, while the shape of the cylindrical bare cell 10' shown in FIG. 7 is different from the shape of the prismatic bare cell 10 shown in FIG. 2, seat 29 formed in the adaptor structure mounted on top of the bare cell is the same for both of the cylindrical bare cell 10' and the prismatic bare cell 10. Therefore, the standardized protective circuit module 30 can be commonly used for both of the cylindrical bare cell 10' and the prismatic bare cell 10, such that the standardized protective circuit module 30 may be incorporated into a single exterior shape and volume that will be compatible with many different shapes, sizes, types and voltages of battery assemblies.

That is, when the type or size of the battery is changed, only the type or size of the adaptor structure that is positioned on the upper portion of the bare cell is changed, and the seat in which protective circuit module is seated has a constant shape at all times. Therefore, the standardized protective circuit module can be commonly used for various types of batteries. As a result, since there is no need to manufacture the complicated protective circuit module according to various types of batteries, the productivity of the battery can be improved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and—equivalents thereof.

What is claimed is:

1. A battery assembly, comprising: a bare cell having a cap plate which is located on a side of the bare cell and closes the bare cell;
   an adaptor structure located on the cap plate, said adaptor structure having a seat located on a first end of the adaptor structure and external input and output terminals for charging and discharging the bare cell located on a second end of the adaptor structure, said first end and said second end being on opposite sides of the adaptor structure; and
   a protective circuit module comprising a protective circuit, said seat of said adaptor structure being an indentation in the adaptor structure configured to accommodate the protective circuit module, the protective circuit module being accommodated upon the seat,
   wherein the protective circuit module has the same thickness as the indentation and a top surface of the protective circuit module is flush with the top surface of the second end of the adaptor structure.

2. The battery assembly of claim 1, wherein the bare cell comprises:
   a can;
   an electrode assembly received in the can;
   a cap assembly sealing a first end portion of the can; and
   an electrode terminal protruding from the cap assembly.

3. The battery assembly of claim 2, wherein the adaptor structure comprises a first lead and a second lead formed in an interior of the adaptor structure for electrically connecting the protective circuit module to the bare cell.

4. The battery assembly of claim 3, wherein the first lead electrically connects the cap assembly of the bare cell to an external input and output terminal unit, and the second lead electrically connects the electrode terminal of the bare cell to the external input and output terminal unit.

5. The battery assembly of claim 4, wherein:
   the cap plate is electrically connected to a first electrode of the electrode assembly, and the electrode terminal is electrically connected to a second electrode of the electrode assembly; and
   an insulating sheet is formed between the second lead and the cap plate.

6. The battery assembly of claim 3, wherein the adaptor structure comprises:
   a first recess formed on a surface of the adaptor structure facing the bare cell and being positioned corresponding to the first lead so as to provide a space in which the bare cell and the first lead are connected; and
   a second recess formed on said surface of the adaptor structure facing the bare cell and being positioned corresponding to the second lead so as to provide a space in which the bare cell and the second lead are connected.

7. The battery assembly of claim 3, wherein:
   the protective circuit module comprises a first connecting terminal and a second connecting terminal formed on a side of the protective circuit module that is facing the adaptor structure; and
   the first connecting terminal and the second connecting terminal are respectively connected to the first lead and the second lead formed within the interior of the adaptor structure.

8. The battery assembly of claim 7, wherein the adaptor structure comprises:
   a first connecting hole formed on a surface of the adaptor structure facing the protective circuit module and being positioned corresponding to the first lead and the first connecting terminal so as to provide a space in which the first lead and the first connecting terminal are electrically connected; and
   a second connecting hole formed on said surface of the adaptor structure facing the protective circuit module and being positioned corresponding to the second lead and the second connecting terminal so as to provide a space in which the second lead and the second connecting terminal are electrically connected.

9. The battery assembly of claim 1, wherein the protective circuit module has a standardized shape operationally connectable to a plurality of bare cells, and said plurality of bare cells comprise a cylindrical bare cell, a prismatic bare cell, a circular bare cell, and a pouch bare cell.

10. The battery assembly of claim 1, comprising a safety element formed within an interior of the adaptor structure.

11. The battery assembly of claim 10, wherein the safety element comprises at least one of a fuse, a bimetal, and a positive temperature coefficient element.

12. The battery assembly of claim 10, wherein the safety element is electrically connected to a second lead that is connected between an electrode terminal of the bare cell and the protective circuit module.

13. The battery assembly of claim 1, wherein the adaptor structure is formed from a molding material.

14. The battery assembly of claim 13, wherein the adaptor structure is formed as a case.

15. The battery assembly of claim 1, wherein the protective circuit module is mechanically and electrically coupled to the adaptor structure.

16. The battery assembly of claim 15, comprising:
   a coupling protrusion formed on a portion of the protective circuit module that is facing the adaptor structure;

a coupling recess formed on a portion of the adaptor structure that is facing the protective circuit module;

the coupling protrusion of the protective circuit module is coupled to the coupling recess of the adaptor structure, so that the protective circuit module and the adaptor structure are coupled to each other.

17. The battery assembly of claim 1, comprising an external input and output terminal unit formed on the protective circuit module and exposed to an exterior of the protective circuit module.

18. The battery assembly of claim 1, comprising an external input and output terminal unit formed on the adaptor structure and exposed to an exterior of the adaptor structure.

19. The battery assembly of claim 18, wherein the adaptor structure comprises an auxiliary substrate positioned within an interior of the adaptor structure, one side of the auxiliary substrate being formed with the external input and output terminal unit being exposed to an exterior of the adaptor structure, and another side of the auxiliary substrate being connected to the protective circuit module via a connecting member formed within the interior of the adaptor structure.

20. The battery assembly of claim 1, comprising a case covering the protective circuit module and the adaptor structure.

21. The battery assembly of claim 20, comprising:

an external input and output terminal unit formed on one of the adaptor structure and the protective circuit module and exposed to an exterior of the one of the adaptor structure and the protection circuit module; and a pad unit formed in a region of the case that contacts the external input and output terminal unit, the pad unit being electrically connected to the external input and output terminal unit.

* * * * *